Patented Jan. 3, 1939

2,142,604

UNITED STATES PATENT OFFICE 2,142,604

PRESERVATION OF CELLULOSIC MATERIALS

Thomas S. Carswell, Kirkwood, Mo., assignor to Monsanto Chemical Company, St. Louis, Mo., a corporation of Delaware No Drawing. Application April 17, 1936, Serial No. 74,960

2 Claims. (Cl. 21—4)

The present invention relates to the treatment of cellulosic materials such as constitute the substance of cordage, rope and the like, which are exposed to relatively intense action of the agencies of decay, and it has particular relation to the treatment of cordage, rope and similar cellulosic materials which are subjected to immersion in water.

The main object of the invention is to provide a simple and economical method of treating ropes or other cellulosic textile materials, involving the use of a chemical compound which has the property of substantially reducing the rate of decay or degeneration of the cellulosic material under the action of water and other common agencies of decay.

The rapid degeneration of cellulosic materials, such as constitute the fibers of ropes and cordage, when they are exposed to the action of water and particularly of sea water or other waters highly charged with mineral salts has heretofore been noted. It has been proposed to retard the rate of degeneration of the rope by treatment with various protective substances which have the property of providing moisture resistant films about the fibers constituting the rope or cordage, or which otherwise exerted a protective action against the agencies of decay. Among the substances which have been proposed for this purpose may be mentioned the insoluble soaps of fatty acids and heavy metals such as copper. None of the materials heretofore proposed has been entirely satisfactory. The protective action of many of them is not sufficiently high to warrant the expense involved in their application. Others are of such slippery nature that their application to many types of rope and cordage is objectionable because they induce slippage of knots that may be tied in the rope.

The present invention is based upon the discovery that certain condensation or reaction products of phenolic compounds and ketones are of unusual merit in the treatment of ropes, cordage or other forms of cellulosic materials to protect them from the agencies of decay and particularly from the action of salt or fresh water. The reaction product of phenol with cyclohexanone may be mentioned as a typical example of a compound of the class which is highly effective. The reaction product is obtained by simply heating together a mixture consisting of suitable proportions of cyclohexanone and phenol. Adequate purification for practical purposes may be obtained by washing with hot water. A convenient method of preparation is discussed in greater detail in Ber. der Deutsch Chem. Ges., vol. 43, pages 2819–20. The product is of the probable formula:

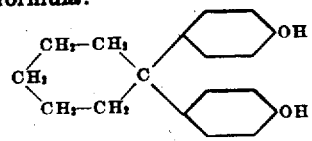

Phenol may be replaced by orthochlorphenol, cresol (ortho, meta or para), naphthol (alpha or beta), propylated or butylated phenol and the like. Any one of these phenols may be similarly reacted with other ketones. Examples of the latter are acetone, ethyl methyl ketone, diethyl ketone, quinone, anthraquinone, etc.

In the application of these reaction products to ropes and cordage or similar materials the phenol-ketone reaction product is dissolved in a suitable solvent such as butyl alcohol, benzene, alcohol, ether, or chloroform or mixtures thereof with an oil such as cordage oil. Cordage oil by itself is also contemplated. The preservative material may be incorporated into the material to be preserved in varying proportions but good results have been obtained by the addition of from 2½ to 5% by weight of the cellulosic material. The concentration of the preservative agent in the solvent should be such as to obtain the desired percentage of preservative in the material to be protected when the latter is soaked in the solution. In case butyl alcohol is employed as a solvent for the reaction product of cyclohexanone and phenol, it is found that ordinary manila rope or cord will absorb the alcoholic solution in the proportion of about 42.3 grams per 94.5 grams of the rope. It is, of course, easy to determine the percentage of protective agent required in the alcohol to obtain the desired percentage in the rope.

Application of the solution to rope or the like may be effected in various ways, for example, a convenient method involves simple dipping into the solution in a suitable container. Penetration of the solution into the interstices of ropes and cord may be promoted if desired by application of pressure or by other conventional treatments. The solution may be hot or cold as desired. The solution of protective material may also be incorporated with the oil usually employed in the lubrication of the strands of rope during the spinning operation. Solution of the preservative may be promoted by admixture of benzene or other solvent with the oil.

For purposes of determining the value of the new materials in the protection of rope against the agencies of decay, samples of new manila rope of 7/16 inch diameter were impregnated with 5% (based upon the weight of the rope) of the reaction product of cyclohexanone and phenol by the method previously described. Samples of the treated rope and similar samples of untreated rope were then completely immersed in sea water for a period of 3 months. At the conclusion of this time the samples were taken out of the water, dried and subjected to progressively increasing tensile stress until they broke. It was found that an average load of 622 lbs. was required to break the ropes which had been impregnated with the reaction product of cyclohexanone and phenol. In contradistinction the control test pieces broke under a load of 302 lbs. In other words, ropes protected by the cyclohexanone-phenol reaction products after ageing in sea water were found to be more than twice as strong as the unprotected controls.

It is to be understood that, if desired, applications of the protective material may be made to ropes and cordage from time to time throughout the life thereof. In this way it is possible greatly to extend the period of utility of such materials when they are exposed to fresh or salt water or to the atmosphere.

The new protective materials are obtained from relatively inexpensive primary ingredients by simple reactions. The expense of treating ropes and cordage is slight and accordingly the overall expense of treatment is relatively small. Decay or deterioration of cellulosic materials is in many instances due, at least in part, to bacterial action. The materials herein disclosed are strongly antiseptic and tend to inhibit growth of bacteria. This property may, if desired, be enhanced by addition of suitable antiseptics. Examples of these are: tri, tetra and pentachlorphenols and mixtures of two or more thereof, benzylphenol (ortho, meta or para, or mixtures thereof), orthochlorcresol, hexylresorcinol, and other alkyl phenols, mercuric chloride, etc. The ratio of the antiseptic may be varied over a wide range. For example, 10 to 50% based upon the amount of keytone-phenol reaction product may be employed. The ketone-phenol reaction products may also be added to common preservatives, such as copper oleate and the like, in amounts of 10 to 50% and the mixture incorporated into rope in convenient manner.

The protective materials may be applied to cellulose-containing fabrics other than rope or cordage. For example, they may be applied to fabrics such as cotton, jute, hemp and ramie. They may also be applied with advantage to wood or similar material which is subject to the action of water and, therefore to decay.

Although only the preferred forms of the invention have been described, it will be apparent to those skilled in the art that numerous modifications may be made therein without departure from the spirit thereof or the scope of the appended claims.

What I claim is:

1. In the treatment of a material embodying cellulose fibres that is to be subjected to immersion in water, the process which comprises impregnating the material with a cyclohexanone-phenol condensation product, whereby the cellulose fibres of the material are rendered more resistant to decay and weakening produced by bacterial and other actions resulting from immersion in water while at the same time their normal characteristics are not substantially impaired.

2. A material embodying cellulose fibres that is to be subjected to immersion in water, the constituent fibres of which have been impregnated with a cyclohexanone-phenol condensation product in an amount sufficient to render the cellulose fibres more resistant to decay and weakening produced by bacterial and other actions resulting from immersion in water, but insufficient to substantially impair their normal characteristics.

THOMAS S. CARSWELL.

---

CERTIFICATE OF CORRECTION.

Patent No. 2,142,604. January 3, 1939.

THOMAS S. CARSWELL.

It is hereby certified that error appears in the printed specification of the above numbered patent requiring correction as follows: Page 2, second column, line 12, after "cotton," insert the word and comma "linen,"; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.

new materials in the protection of rope against the agencies of decay, samples of new manila rope of 7/16 inch diameter were impregnated with 5% (based upon the weight of the rope) of the reaction product of cyclohexanone and phenol by the method previously described. Samples of the treated rope and similar samples of untreated rope were then completely immersed in sea water for a period of 3 months. At the conclusion of this time the samples were taken out of the water, dried and subjected to progressively increasing tensile stress until they broke. It was found that an average load of 622 lbs. was required to break the ropes which had been impregnated with the reaction product of cyclohexanone and phenol. In contradistinction the control test pieces broke under a load of 302 lbs. In other words, ropes protected by the cyclohexanone-phenol reaction products after ageing in sea water were found to be more than twice as strong as the unprotected controls.

It is to be understood that, if desired, applications of the protective material may be made to ropes and cordage from time to time throughout the life thereof. In this way it is possible greatly to extend the period of utility of such materials when they are exposed to fresh or salt water or to the atmosphere.

The new protective materials are obtained from relatively inexpensive primary ingredients by simple reactions. The expense of treating ropes and cordage is slight and accordingly the overall expense of treatment is relatively small. Decay or deterioration of cellulosic materials is in many instances due, at least in part, to bacterial action. The materials herein disclosed are strongly antiseptic and tend to inhibit growth of bacteria. This property may, if desired, be enhanced by addition of suitable antiseptics. Examples of these are: tri, tetra and pentachlorphenols and mixtures of two or more thereof, benzylphenol (ortho, meta or para, or mixtures thereof), orthochlorcresol, hexylresorcinol, and other alkyl phenols, mercuric chloride, etc. The ratio of the antiseptic may be varied over a wide range. For example, 10 to 50% based upon the amount of ketone-phenol reaction product may be employed. The ketone-phenol reaction products may also be added to common preservatives, such as copper oleate and the like, in amounts of 10 to 50% and the mixture incorporated into rope in convenient manner.

The protective materials may be applied to cellulose-containing fabrics other than rope or cordage. For example, they may be applied to fabrics such as cotton, jute, hemp and ramie. They may also be applied with advantage to wood or similar material which is subject to the action of water and, therefore to decay.

Although only the preferred forms of the invention have been described, it will be apparent to those skilled in the art that numerous modifications may be made therein without departure from the spirit thereof or the scope of the appended claims.

What I claim is:

1. In the treatment of a material embodying cellulose fibres that is to be subjected to immersion in water, the process which comprises impregnating the material with a cyclohexanone-phenol condensation product, whereby the cellulose fibres of the material are rendered more resistant to decay and weakening produced by bacterial and other actions resulting from immersion in water while at the same time their normal characteristics are not substantially impaired.

2. A material embodying cellulose fibres that is to be subjected to immersion in water, the constituent fibres of which have been impregnated with a cyclohexanone-phenol condensation product in an amount sufficient to render the cellulose fibres more resistant to decay and weakening produced by bacterial and other actions resulting from immersion in water, but insufficient to substantially impair their normal characteristics.

THOMAS S. CARSWELL.

---

CERTIFICATE OF CORRECTION.

Patent No. 2,142,604.                    January 3, 1939.

THOMAS S. CARSWELL.

It is hereby certified that error appears in the printed specification of the above numbered patent requiring correction as follows: Page 2, second column, line 12, after "cotton," insert the word and comma "linen,"; and that the said Letters Patent should be read with this correction therein that the same may conform to the record of the case in the Patent Office.

Signed and sealed this 4th day of April, A. D. 1939.

Henry Van Arsdale (Seal)                          Acting Commissioner of Patents.